United States Patent [19]

Shotey et al.

[11] Patent Number: 5,527,993
[45] Date of Patent: Jun. 18, 1996

[54] WEATHERPROOF ELECTRICAL OUTLET APPARATUS

[76] Inventors: Michael J. Shotey, 7733 E. Cypress, Scottsdale, Ariz. 85257; Michael P. McConnaughy, 18309 N. 39th Ave., Glendale, Ariz. 85308

[21] Appl. No.: 155,205

[22] Filed: Nov. 22, 1993

[51] Int. Cl.⁶ .................................................. H02G 3/00
[52] U.S. Cl. .................... 174/67; 220/242; 439/136; 439/147
[58] Field of Search ............... 174/66, 67; 220/242; 439/136, 147

[56] References Cited

U.S. PATENT DOCUMENTS

| | | | |
|---|---|---|---|
| 3,449,706 | 6/1969 | Catissimi | 174/67 X |
| 3,467,763 | 9/1969 | Shaw | 174/67 |
| 4,803,307 | 2/1989 | Shotey | 174/67 |
| 5,245,507 | 9/1993 | Ericksen | 174/67 X |

Primary Examiner—Kristine L. Kincaid
Assistant Examiner—Michael J. Cornelison
Attorney, Agent, or Firm—H. Gordon Shields

[57] ABSTRACT

Weatherproof electrical enclosure apparatus includes an electrical outlet and a cover pivotally secured to the outlet for sealingly engaging outlet elements to prevent moisture and foreign material from contacting electrical elements of the outlet. Secondary sealing elements are included to insure that moisture and foreign elements are prevented from entering into and contacting the electrical elements. The cover is pivotally secured with a releasable hinge to the outlet, and the cover includes an aperture or opening through which a cord extends. Secondary seal elements help to insure that the opening in the cover is sealed about the electrical cords. A primary embodiment includes a boot disposed around the outlet itself, and cords connected to the outlet contact the boot and are sealed by the boot.

13 Claims, 3 Drawing Sheets

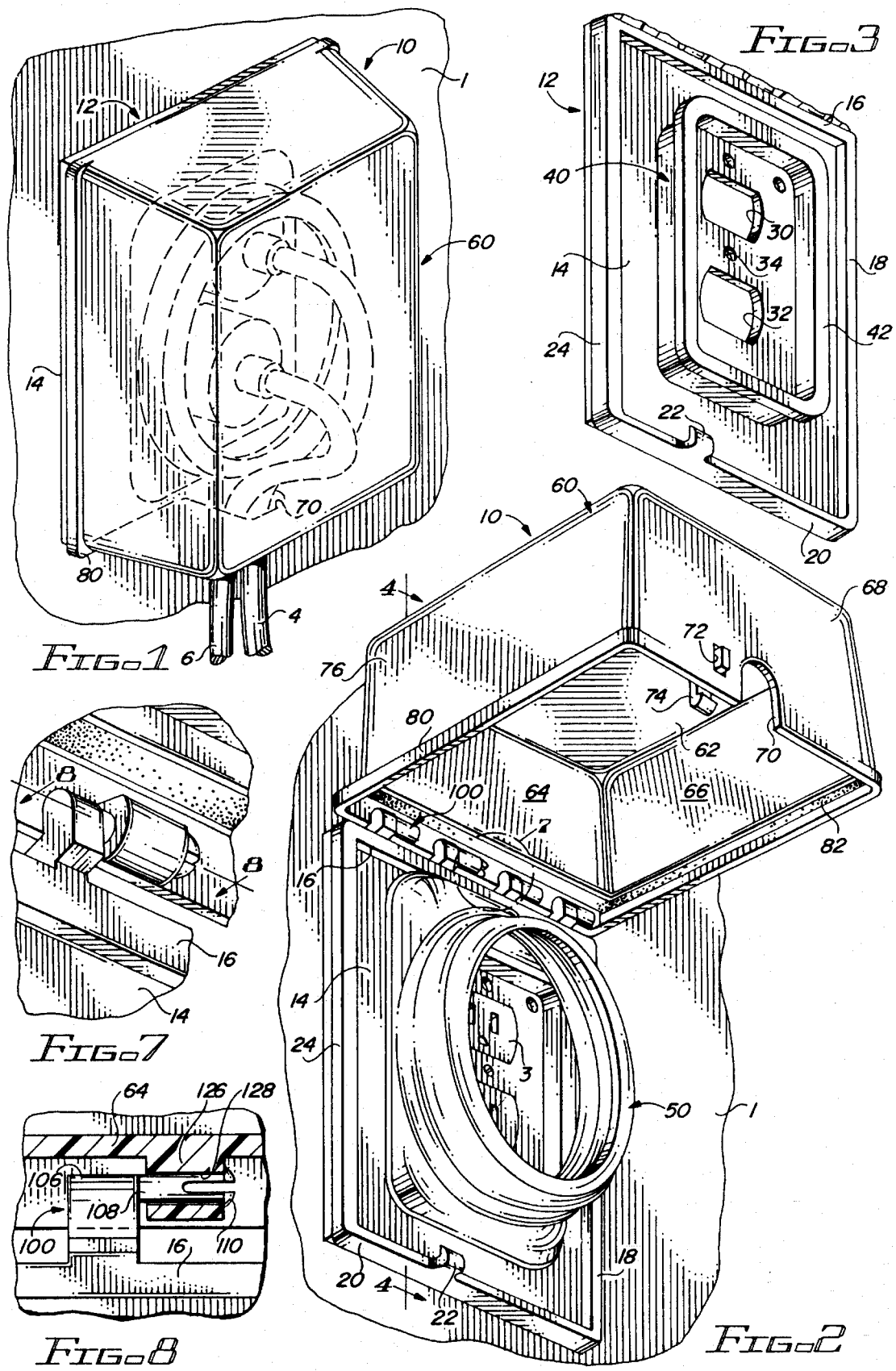

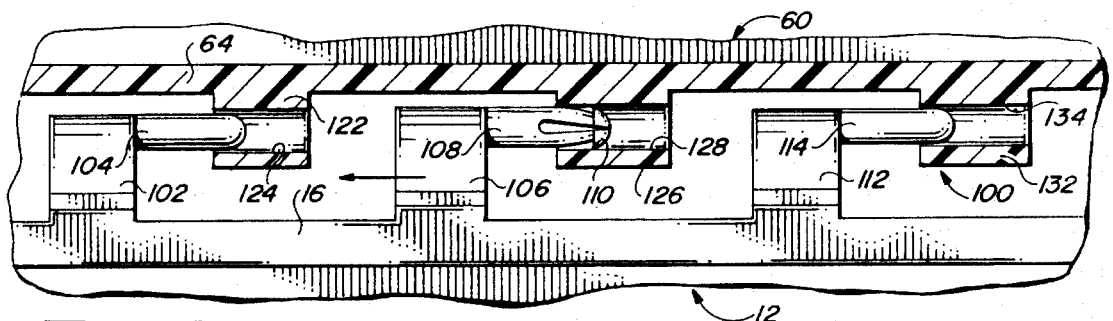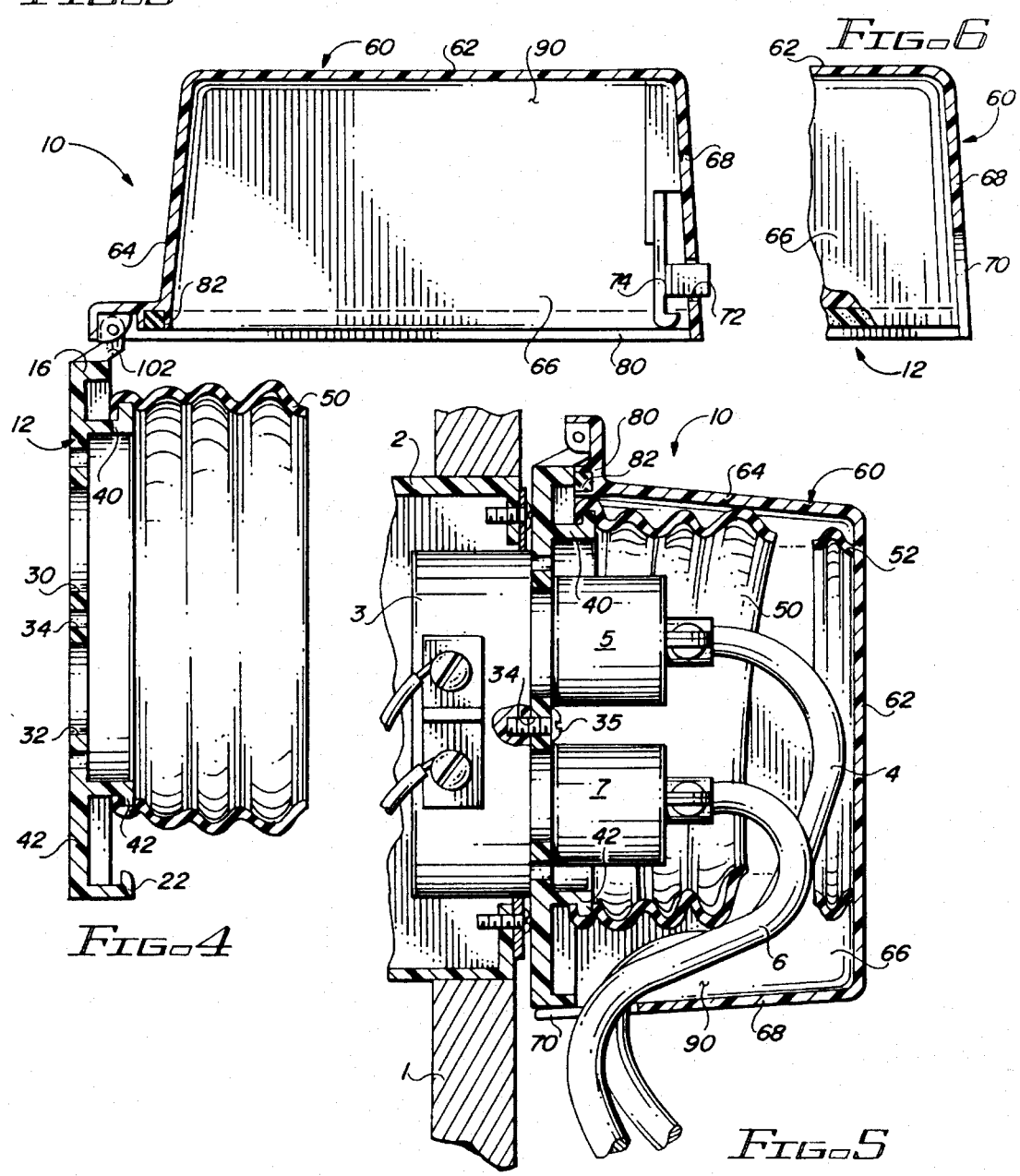

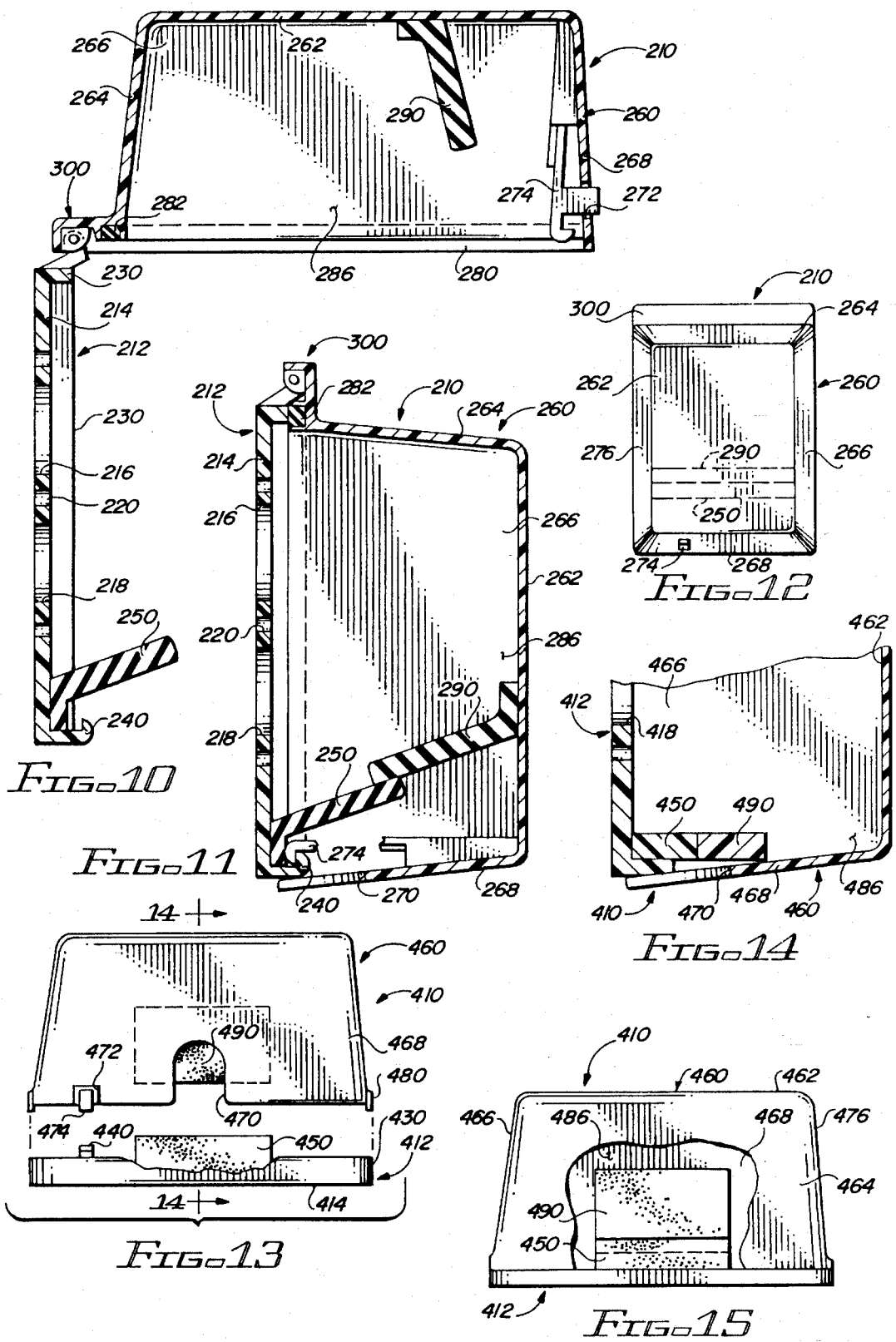

5,527,993

WEATHERPROOF ELECTRICAL OUTLET APPARATUS

BACKGROUND OF THE INVENTION

1. Field of the Invention

This invention relates to electrical outlets and, more particularly, to a weatherproof electrical outlet which includes a cover through which a cord extends, the cover being a primary weatherproofing element, and which includes secondary weatherproofing elements secured either or both to the cover or to other elements of the outlet.

2. Description of the Prior Art

U.S. Pat. No. 4,803,307 (Shotey) discloses a weatherproof outlet cover. This patent comprises a first generation of weatherproof outlet apparatus by the inventor of the present apparatus.

U.S. Pat. No. 4,874,906 (Shotey) is a continuation of the '307 patent.

In the above patents, the electrical outlet includes a cover, and the cover sealingly encloses the outlet to prevent moisture and foreign elements from getting into the outlet and the cover. The sealing function is accomplished by various elements associated with the cover and with the outlet itself. However, the electrical cord extends through an opening in the cover, and that opening is not sealed. Accordingly, moisture and other foreign matter may penetrate into the interior of apparatus through the opening or aperture in the cover under certain circumstances.

The apparatus of the present invention overcomes the deficiency of the prior art by including secondary sealing elements to prevent moisture and foreign material from contacting the electrical elements within the outlet apparatus.

SUMMARY OF THE INVENTION

The invention described and claimed herein comprises a base secured to an outlet and a cover pivotly secured to the base by a releasable hinge. Several embodiments are included, including an embodiment in which a boot is secured to the base and about the outlet for protecting the cord connected to the outlet and enclosed by the cover. Other embodiments include sealing elements secured to the cover and to the base for sealingly engaging the electrical cords to prevent moisture and foreign elements from contacting the electrical elements of the outlet.

Among the objects of the present invention are the following:

To provide new and useful water resistant electrical outlet apparatus;

To provide new and useful water resistant electrical outlet apparatus having a cover secured to the outlet with a releasable hinge;

To provide new and useful seal apparatus for sealing electrical cords in a weatherproof electrical outlet having a cover through which the cords extend;

To provide new and useful seal elements for sealing electrical connections in a weatherproof electrical outlet assembly; and To provide new and useful electrical outlet apparatus including an electrical outlet and a cover pivotly secured thereto.

BRIEF DESCRIPTION OF THE DRAWING

FIG. 1 is a perspective view of the apparatus of the present invention.

FIG. 2 is a perspective view of the apparatus of FIG. 1 showing the apparatus in its "open" configuration.

FIG. 3 is a perspective view of a portion of the apparatus of the present invention.

FIG. 4 is a view in partial section taken generally along line 4—4 of FIG. 2.

FIG. 5 is a view in partial section illustrating the use environment of the apparatus of the present invention.

FIG. 6 is a view in partial section illustrating a portion of the apparatus of the present invention.

FIG. 7 is an enlarged perspective view of a portion of the apparatus of FIG. 2 taken generally from Circle 7 of FIG. 2.

FIG. 8 is a view in partial section taken generally along line 8—8 FIG. 6.

FIG. 9 is a view in partial section illustrating the operation of a portion of the apparatus of the present invention.

FIG. 10 is a side view in partial section of an alternate embodiment of the apparatus of the present invention.

FIG. 11 is a side view of the apparatus of FIG. 12 in its closed configuration.

FIG. 12 is a front view of the apparatus of FIG. 11.

FIG. 13 is a bottom view of another alternate embodiment of the apparatus of the present invention.

FIG. 14 is a side view in partial section illustrating a portion of the apparatus of FIG. 12.

FIG. 15 is a top view, partially broken away, illustrating the apparatus of FIG. 15 in its closed configuration.

DESCRIPTION OF THE PREFERRED EMBODIMENT

FIG. 1 is a perspective view of electrical cover apparatus 10 embodying the present invention. The apparatus 10 is secured to a wall 1. FIG. 2 is a perspective view of the apparatus 10 in its open position. The apparatus includes a base element 12 secured to the wall 1, or to an outlet 3, and a cover 60 which is pivotly secured to the base 12. FIG. 3 is a perspective view of the base 12. FIG. 4 is a view in partial section taken generally along line 4—4 of FIG. 2, showing the cover 60 pivoted upwardly from the base 12. A boot 50 is shown secured to the plate 12 in both FIGS. 2 and 4.

FIG. 5 is a side view in partial section of the apparatus 10 in its use environment, including details of the wall 1 and related elements. FIG. 6 is a view in partial section of a portion of the cover 60. For the following discussion, reference will primarily be made to FIGS. 1, 2, 3, 4, 5, and 6.

The apparatus 10 comprises a base 12 and cover 60 pivotly secured to the base 12. The base 12 includes a generally rectangularly configured base plate 14 with a rim extending outwardly from the outer periphery of the base plate 14. The outer rim includes a top portion 16, a side portion 18, a bottom portion 20, and a second side portion 24. The rim cooperates with mating elements of the cover 60 to provide a primary seal for the apparatus 10. This will be discussed below.

The bottom portion 20 includes a lock tab 22 extending outwardly from the bottom 20. The lock tab 22 cooperates with a lock element in a cover 60, as will be discussed below.

The base plate 14 includes a pair of apertures 30 and 32 which are disposed about, and which receive, the outlet connections of the duplex outlet 3. Between the apertures 30 and 32 is a screw hole 34. The screw hole 34 allows the base plate 14, and the base 12, to be secured directly to the outlet 3. A screw 35 is shown in FIG. 5 extending through the screw hole 34 to fasten the base plate 14, and accordingly the base plate 12, to the outlet 3.

Also in FIG. 5, the outlet 3 is shown disposed within an electrical box 2 secured to the wall 1. As is well known and understood in the art, the wall 1 includes a hole or aperture in which the electrical box 2 is disposed and in which it is secured. Electrical conductors are appropriately secured to the outlet 3 to provide electrical current to the outlet.

As best shown in FIG. 3, there is an inner rim 40 which has a generally rectangular configuration which extends outwardly from the base plate 14 about the apertures 30 and 32. The rim 40 includes an outwardly extending flange 42. The boot 50 is secured to the inner rim 40 and disposed about the flange 42. This is best shown in FIGS. 2 and 5.

The boot 50 is preferably a generally flexible element having generally a bellows configuration. The boot accordingly is flexible and deformable and provides a seal about the apertures 30 and 32 for the outlet 3, and for electrical plugs and cords electrically connected thereto. The boot 50 comprises a secondary seal against moisture and foreign material.

The cover 60 includes a front wall 62, a top wall 64, a pair of side walls 66 and 76, and a bottom wall 68. The top wall 64, the bottom wall 68, and the side wall 66 and 76 extend outwardly from the front wall 62. The front wall 62 is appropriately secured to the other four walls 64, 66, 68, and 76. The five walls 62 . . . 76 comprise or define a chamber 90 which receives or encloses the electrical cords and their plugs, as best shown in FIG. 5, and as will be discussed below.

A rim or flange 80 extends about the outer periphery of the four walls 64, 66, 68, and 76, remote from the front wall 62. The rim or flange 80 is adapted to be disposed about, and to matingly engage, the rims 16, 18, 20, and 24, of the base 12. A seal or gasket 82 is disposed on the rim 80 to help provide a seal with the rims 16 . . . 24 of the base 12.

A notch or cord aperture 70 extends through the bottom wall 68. A pair of electrical cords 4 and 6 are shown in FIGS. 1 and 5 extending through the notch 70. The cords 4 and 6 include plugs 5 and 7, respectively, as shown in FIG. 5, which are secured to the duplex outlet 3 and which extend into the chamber 90 of the cover 60.

As shown in FIG. 5, the boot 50 is disposed about the plugs 5 and 7, and the boot extends outwardly toward the front wall 62 of the cover 60 a distance substantially greater than overall length of the notch 70 in the bottom wall 60. Accordingly, the boot 50 protects the outlet 3 and the plugs 5 and 7 from any water spray, or the like, which may be blown or otherwise moved through the notch 70 into the interior chamber 90 of the cover 60.

If desired, the boot 50 may be of a height or length sufficient to extend all the way to the front wall 62. Moreover, if also desired, and in the alternative, the boot 50 may be made in two portions, with a portion secured to the flange 42 and the rim 40, and another portion 52 secured to the front wall 62 of the cover 60. Furthermore, the boot 50 may be made "long" enough and sufficiently pliable or flexible to the extent that it virtually contacts the front wall 62 of the cover 60 except where the cords 4 and 6 make direct contact with the bottom of the boot 50. Obviously, several variations are possible, and any desired configuration may be used, depending on the type of water resistant protection that is desired. The boot itself, as shown in FIG. 5, provides sufficient protection to comply with appropriate water resistant standards currently in use.

An aperture 72 also extends through the bottom panel 68. A lock element 74 is secured to the bottom wall 72 adjacent to the aperture 72. The lock element 74 includes a release tab which extends through the aperture 72.

The lock element 74 also includes a hook portion which engages the lock element 22 of the base 12. Pressing against or moving the release tab of the locking element 74 causes the hook portion to move away from the lock element 22 to release the cover 60.

The cover 60 pivots relative to the base 12 on a hinge assembly 100. The hinge assembly 100 is shown in detail in FIGS. 7, 8, and 9. FIG. 7 is a perspective view of a portion of the hinge assembly 100 taken generally from Circle 7 of FIG. 2. FIG. 8 is a view in partial section of the elements of the hinge 100 of FIG. 7 taken generally along line 8—8 of FIG. 7. FIG. 9 is a view in partial section through the hinge assembly 100. For the following discussion of the hinge assembly 100, reference will primarily be made to FIGS. 7, 8, and 9.

The hinge assembly 100, as best shown in FIG. 9, includes three ears extending outwardly from the top rim 16 of the base 12. The ears each include a pin extending outwardly from the ear. The three ears and their pins include an ear 100 with a pin 102, a center ear 106 with a bifurcated pin 108, and a ear 112 with a pin 114. The ears 102, 106, and 112 are generally parallel to each other, and the pins 104, 108, and 114 are aligned coaxially with each other.

The center, bifurcated pin 108 includes an outer lock element 110. The center pin 108 is bifurcated or divided into two portions at its distal tip and at the lock elements 110. In actuality the pin 108 includes a longitudinally extending slot from its distal tip "rearwardly" towards the ear 106. The slot allows the locking elements 110, the diameter of which is greater than that of the pin 108, to be squeezed or compressed to the diameter of the pin, as will be discussed below.

There are matching ears which extend outwardly from the top wall 64 of the cover 60. They include ears 122, 126, and 132. The three ears 122, 126, and 132 each include an axially extending bore through which the respective pins extend. The ear 122 includes a bore 124 through which the pin 104 extends. The ear 126 includes a bore 128 through which the pin 108 extends. The ear 132 includes a bore 134 to which the pin 114 extends. The ears and pins comprise a hinge assembly which secures the cover 60 to the base 12 and allows the cover 60 to pivot relative to the base.

In FIGS. 7 and 8, the operation of the bifurcated pin 108 and its outer lock element 110 is shown. The length of the pin 108 between the ear 106 and the outer lock element 110 is slightly greater than the length of the ear 126. The diameter of the pin 108 is substantially the same as, or slightly less than, the diameter of the bore 128. However, the outer diameter of the lock element 110 is greater than the diameter of the bore 128. The slot or bifurcation in the pin 108 allows the lock element 110 to be reduced, as shown in FIG. 9 to the diameter of the bore 128. Accordingly, when the pins 104, 108, and 114 are appropriately aligned with the bores 124, 128, and 134, respectively, the lock element 110 of the pin 108 is appropriately biased inwardly to reduce the diameter of the lock element 110 so that it will move through the bore 128. The base 12 and cover 60 are then moved relative to each other, typically by an appropriate movement of the cover 60, as shown by the large arrow in FIG. 8. The three pins 104, 108, and 114 then extend into the respective bores 124, 128, and 134.

When the lock element 110 has passed through the bore 128, as shown in FIG. 8, the inherent springiness of the bifurcated elements of the pin 108 causes the lock element 110 to move outwardly to lock in place against the ear 126. In this manner, the cover 60 in typically secured to, and releasably engaged with, the base 12.

If it is desired to remove the cover 60, all that needs to be done to accomplish the removal is an inward force directed against the lock element 110 to allow the lock element to move into the bore 128. The cover 60 is then moved relative to the base 12, in the reverse manner as the installation, as described above, and the cover 60 may then be separated from the base 12.

FIG. 10 is a side view in partial section of an alternate embodiment 210 of the present invention. In FIG. 10, the apparatus 210 is shown with a base 212 and a cover 260, with the cover 260 in the open position. FIG. 11 is a view in partial section of the apparatus 210 showing the cover 260 in its closed position, disposed against the base 212. FIG. 12 is a front view of the apparatus 210. For the following discussion, reference will primarily be made to FIGS. 10, 11, and 12.

The cover 260 is pivotly secured to the upper or top portion of the base 212. The base 212 includes a plate 214 and a rim 230 is disposed or extends about the outer periphery of the plate 214. Extending through the plate 214 is an outlet aperture 216 and a outlet aperture 218. An aperture 220 is disposed between the apertures 216 and 218. The aperture 220 receives a screw which secures the base 212 to an outlet. This is substantially identical to the corresponding portion of the base 12, discussed in detail above. However, instead of the inner rim 40 which is disposed about the outlet apertures of the apparatus 10 and the boot 50 secured to the inner rim, the apparatus 210 includes a seal panel or gasket 250 secured to the lower portion of the plate 214 and to the bottom of the rim 230. The seal panel or gasket 250 is preferably made of closed cell foam so that it will not absorb or retain water or moisture.

The seal 250 extends outwardly and generally upwardly, away from the plate 214 and into a chamber 286 within the cover 260 when the cover 260 is in the down, closed and locked position, as shown in FIG. 11.

The cover 260 is substantially identical, generally, to the cover 60 of the apparatus 10. The cover 260 includes a front panel 262, and there are four panels secured to the front panel 260. The four panels include a top panel 264, a bottom panel 268, and a pair of side panels 266 and 276. An outer rim and flange 280 is disposed about the top, bottom, and side panels remote from the front panel 262. The rim and flange 280 matingly engages the rim 230 of the base 212, as generally described above with respect to the corresponding elements of the apparatus 10. A gasket element 282 is disposed on the rim and flange 280 to help seal the base 212 and the cover 260. The gasket 282, along with the rim and flange 280 and the rim 230, comprise a primary seal for the apparatus 210.

There is a lock element 240 appropriately secured to the bottom of the plate 214 of the base 212. The lock element 240 cooperates with a lock element 274 secured to the bottom panel 268, as substantially the same fashion as the lock element 22 cooperates with the lock element 74 of the cover 60. There is an aperture 272 in the panel 268 through which a portion of lock element 274 extends for releasing the lock element 274 from the lock element 240 to allow the cover 260 to be pivoted relative to the base 212.

A cord opening or slot 270 extends through the bottom of the panel 268, remote from the front panel 262. The opening 270 is substantially identical to the opening or slot 70 in the bottom panel 68 of the cover apparatus 60. Electrical cords (not shown) extend through the slot 270 when the cords are connected to an outlet to which the apparatus 210 is secured.

A closed cell foam seal panel 290 is appropriately secured to the front panel 262 of the cover 60. The panel 290 extends outwardly and downwardly within the cover chamber 286 and overlaps the panel 250 of the base 12. Both panels 250 and 290 are flexible, and accordingly yield or deform in the area of the cord or cords when the cover 260 is closed. The seal panels 250 and 290 accordingly provide an inner, secondary seal for the base 212 and the cover 260 to help prevent moisture or water droplets, etc., from entering into the apparatus 210 in the area of the outlets (not shown) to which the apparatus 210 is secured.

FIG. 13 is a bottom view of an alternate embodiment 410 of the apparatus of the present invention. The apparatus 410 includes a base 412 and a cover 460 pivotly secured to the base 412. In FIG. 13, the cover 460 is pivoted away from the base 412.

FIG. 14 is a view in partial section taken generally along line 14—14 of FIG. 13, but with the cover 460 in its closed position relative to the base 412. FIG. 15 is a top view of the apparatus 410, with a portion broken away to show the seal elements substantially as shown in FIG. 14. For the following discussion of the apparatus 410, reference primarily be made to FIGS. 13, 14, and 15.

The base 412 includes a plate 414 which is substantially identical, generally, to the plate 214 of the apparatus 210. The base 412 includes a plate with a pair of outlet apertures, of which one, a lower outlet aperture 418, or a portion thereof, is shown in FIG. 14. The base 412 also includes an outer rim 430, a portion of which is broken away in FIG. 13.

A lock element 440 extends outwardly from the lower portion of the outer rim 430 and cooperates with a lock element 472 of the cover 460.

The cover 460 includes a front panel 462, a top panel 464, a pair of side panels 466 and 476, and a bottom 468. The cover 460 also includes an outer rim and flange 480 which extends about the outer periphery of the cover 460 and matingly engages the rim 430 of the base 412. Within the cover 460 is a chamber 486.

Extending into the bottom panel 468, remote from the front panel or wall 462, is an aperture or slot 470 through which electrical cords extend. An aperture 472 also extends through the bottom 468. The lock element 474 extends through the aperture 472. A portion of the lock element 474 extends through the aperture 472 to release the lock elements 472 and 440 to allow the cover 460 to be moved relative to the base 414.

A relatively flexible gasket or seal panel 450, preferably made of closed cell foam, is appropriately secured to the bottom portion of the plate 414 and an adjacent portion of the rim 430. The gasket 450 extends outwardly over a portion of the slot 470. The width of the gasket 450, as best shown in FIG. 13, is substantially wider than the aperture or slot 470.

A second gasket or seal panel 490, also preferably made of closed cell foam, is appropriately secured to the bottom panel or wall 468 of the cover 460. The gasket 490 similarly extends over a portion of the slot 470 and matingly engages or contacts the gasket 450. The outer edges of the gaskets 450 and 490 are in contact with each other in the closed position of the cover 460 relative to the base 412, as shown in FIGS. 14 and 15 to effect a seal when there are no cords connected to an outlet.

The gaskets 450 and 490 are sufficiently flexible or resilient such that they will mold themselves about a cord or cords which extend through the slot 470. In this manner, the gaskets 450 and 490 act as secondary seal elements to seal the slot 470 about any cord or cords to help prevent moisture, water droplets, or foreign matter, etc., from getting into the apparatus 410 and from migrating toward the outlet to which the apparatus 410 is secured. Obviously, the gaskets 450 and 490 comprise secondary seal elements, with primary seal elements comprising the mating rims of the base 412 in the cover 460, substantially as discussed above in conjunction with the other embodiments herein.

The primary difference between the seal elements 450, 490 and the seal elements 250,290 is in the size of the elements. The seal elements 450, 490 are smaller than the elements 250, 290, and accordingly may be referred to as "gaskets." The smaller "gasket" elements 450, 490 are also secured to the base and cover in a different manner primarily due to their smaller size. The elements 450, 490 are also disposed adjacent to the slot 470, instead of being spaced apart from the slot, as with the seal elements 250, 290.

While moisture or water droplets have been referred to in conjunction with the secondary seals of the apparatus of the present invention, it is obvious that the secondary seal elements also help to prevent foreign elements other than water or moisture from migrating into the plug and cord receiving chamber and related elements of the various embodiments and thus from contacting the electrical outlets to which the various embodiments are secured.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What we claim is:

1. Weatherproof cover apparatus for an electrical outlet and for at least a single electrical cord having a plug connected to the outlet, comprising in combination:

base means to be secured to the electrical outlet, cover means pivotally secured to the base means and defining a chamber for receiving and enclosing a portion of the electric cord and the plug to be connected to the electrical outlet;

slot means in the cover means through which the electrical cord will extend;

first seal means for sealing the base means and the cover means to initially prevent moisture and foreign material from contacting the electrical outlet and plug and comprising a primary seal; and second seal means within the chamber for providing a secondary seal to further prevent moisture and foreign material through the slot means from contacting the electrical outlet and plug, including a first flexible boot secured to the base means and a second flexible boot secured to the cover means.

2. The apparatus of claim 1 in which the base means further includes a rim disposed about the electrical outlet, and the fast flexible boot is secured to the rim.

3. The apparatus of claim 1 in which the cover means includes:

a front wall;

a top wall connected to the front wall and to the base means;

first and second side walls connected to the front wall and the top wall; and a bottom wall connected to the front wall and the side walls, and the slot means extends through the bottom wall.

4. The apparatus of claim 1 in which the base means and cover means include hinge means for releasably securing the cover means to the base means and for pivotally securing the cover means to the base means.

5. The apparatus of claim 4 in which the hinge means includes ear means secured to the base means and to the cover means, including first ears having aligned bores, and second ears having aligned pins extending into the bores, and the cover means pivots on the pins.

6. The apparatus of claim 5 in which the aligned pins include a pin extending through one ear of the first ears and lock means on the pin for locking the pin to the one ear.

7. Weatherproof cover apparatus for an electrical outlet and for at least a single electrical cord having a plug connected to the outlet, comprising, in combination:

base means to be secured to the electrical outlet, cover means pivotally secured to the base means and defining a chamber for receiving and enclosing a portion of the electric cord and the plug to be connected to the electrical outlet;

slot means in the cover means through which the electrical cord will extend;

first seal means for sealing the base means and the cover means to initially prevent moisture and foreign material from contacting the electrical outlet and plug and comprising a primary seal; and second seal means within the chamber for providing a secondary seal to further prevent moisture and foreign material through the slot means from contacting the electrical outlet and plug, including a first seal panel secured to the base means and a second seal panel secured to the cover means.

8. The apparatus of claim 7 in which the cover means includes:

a front wall;

a top wall connected to the front wall and to the base means;

first and second side walls connected to the front wall and the top wall; and a bottom wall connected to the front wall and the side walls, and the slot means extends through the bottom wall.

9. The apparatus of claim 8 in which the first panel is secured to the base means and extends over the slot means.

10. The apparatus of claim 9 in which the second seal panel is secured to the front wall and extends over the slot means and is disposed against the first seal panel.

11. The apparatus of claim 7 in which the base means and cover means include hinge means for releasably securing the cover means to the base means and for pivotally securing the cover means to the base means.

12. The apparatus of claim 11 in which the hinge means includes ear means secured to the base means and to the cover means, including first ears having aligned bores, and second ears having aligned pins extending into the bores, and the cover means pivots on the pins.

13. The apparatus of claim 12 in which the aligned pins include a pin extending through one ear of the first ears and lock means on the pin for locking the pin to the one ear.

* * * * *